United States Patent
Zhai

(10) Patent No.: US 12,254,714 B2
(45) Date of Patent: Mar. 18, 2025

(54) METHODS AND APPARATUSES FOR PERFORMING OBJECT RECOGNITION

(71) Applicant: HANGZHOU HIKVISION DIGITAL TECHNOLOGY CO., LTD., Zhejiang (CN)

(72) Inventor: Zhonghua Zhai, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 554 days.

(21) Appl. No.: 17/631,446

(22) PCT Filed: Jul. 29, 2020

(86) PCT No.: PCT/CN2020/105500
§ 371 (c)(1),
(2) Date: Jan. 29, 2022

(87) PCT Pub. No.: WO2021/018189
PCT Pub. Date: Feb. 4, 2021

(65) Prior Publication Data
US 2022/0277588 A1 Sep. 1, 2022

(30) Foreign Application Priority Data
Jul. 30, 2019 (CN) .......................... 201910696479.X

(51) Int. Cl.
*G06V 40/16* (2022.01)
*G06V 10/771* (2022.01)
*G06V 40/12* (2022.01)

(52) U.S. Cl.
CPC .......... *G06V 40/172* (2022.01); *G06V 10/771* (2022.01); *G06V 40/161* (2022.01); *G06V 40/168* (2022.01); *G06V 40/12* (2022.01)

(58) Field of Classification Search
CPC .... G06V 40/12; G06V 40/161; G06V 40/168; G06V 40/172; G06V 40/174; G06V 10/771; G06V 10/7715
See application file for complete search history.

(56) References Cited

U.S. PATENT DOCUMENTS

| | | | |
|---|---|---|---|
| 5,031,225 | A | 7/1991 | Tachikawa et al. |
| 10,140,713 | B1 | 11/2018 | Schwalb et al. |
| 2020/0250226 | A1* | 8/2020 | Yang .................. G06F 16/5854 |

FOREIGN PATENT DOCUMENTS

| | | |
|---|---|---|
| CN | 105975861 A | 9/2016 |
| CN | 108108357 A | 6/2018 |

(Continued)

OTHER PUBLICATIONS

Kan, et al. (Computer English Translation of Chinese Patent No. CN109447053 A) (Year: 2019).*

(Continued)

*Primary Examiner* — Daniel G Mariam
(74) *Attorney, Agent, or Firm* — Ladas & Parry, LLP

(57) ABSTRACT

Methods and apparatuses for performing object recognition are provided. The method includes: by converting a first feature of a target object extracted using a first extraction model to a feature space of a second extraction model through a first feature conversion model, obtaining a second feature of the target object in the feature space; by matching the second feature of the target object with features of objects in a matching library, obtaining a target feature matched with the second feature of the target object; determining an object to which the target feature belongs as a matching object of the target object. Thus, the present disclosure can save time length of object recognition.

14 Claims, 5 Drawing Sheets

(56) References Cited

FOREIGN PATENT DOCUMENTS

| | | | |
|---|---|---|---|
| CN | 108446692 A | 8/2018 |
| CN | 108509539 A | 9/2018 |
| CN | 108595927 A | 9/2018 |
| CN | 108765295 A | 11/2018 |
| CN | 108806716 A | 11/2018 |
| CN | 109324909 A | 2/2019 |
| CN | 109492601 A | 3/2019 |

OTHER PUBLICATIONS

International Search Report in International application No. PCT/CN2020/105500, mailed on Oct. 22, 2020 with English Translation provided by WIPO.

Written Opinion of the International Searching Authority in International application No. PCT/CN2020/105500, mailed on Oct. 22, 2020 with English translation provided by Google Translate.

State Intellectual Property Office of the People's Republic of China, Office Action and Search Report Issued in Application No. 201910696479.X, Jul. 19, 2022, 25 pages (Submitted with Machine/Partial Translation).

European Patent Office, Extended European Search Report Issued in Application No. 20846719.1, Jul. 29, 2022, Germany, 7 pages.

\* cited by examiner

METHODS AND APPARATUSES FOR PERFORMING OBJECT RECOGNITION

CROSS REFERENCE TO RELATED APPLICATIONS

This application is a U.S. National Phase application of PCT/CN/2020/105500, filed on Jul. 29, 2020, which claims priority to Chinese Patent Application No. 201910696479.X filed on Jul. 30, 2019. The entire content of the above-referenced applications is incorporated herein by reference.

TECHNICAL FIELD

The present disclosure relates to the field of computer technologies, and in particular to methods and apparatuses for performing object recognition.

BACKGROUND

Along with development of computer technologies, object recognitions such as human face recognition, fingerprint recognition, and voiceprint recognition have been deployed and applied in many fields.

In the related arts, during object recognition, an extraction model is usually adopted to extract a feature of a to-be-recognized object, and then compare the extracted feature with a feature of each object in a matching library to determine a feature with highest similarity. An object to which the feature with highest similarity belongs is determined as a matching object of the to-be-recognized object, and identity information of the matching object is determined as identity information of the to-be-recognized object.

Over time, the extraction model will be updated, but the features in the matching library are extracted using a lower version extraction model. Thus, it is possible that a feature extracted using a higher version extraction model after being updated cannot be matched with a feature in the matching library. At this time, it is required to use the higher version extraction model to re-extract the feature of each object from samples so as to form a matching library. But, in a case of a large number of samples (for example, pictures, fingerprints, and audio frequencies), a larger number of data will be involved in the extraction process, leading to consumption of a large amount of time.

SUMMARY

Embodiments of the present disclosure provide methods and apparatuses for performing object recognition, so as to at least solve the problems of a long time consumed for re-extracting the features in a matching library after model update. The technical solution is described below.

According to a first aspect, there is provided a method of performing object recognition. The method includes:
  by converting a first feature of a target object extracted using a first extraction model to a feature space of a second extraction model through a first feature conversion model, obtaining a second feature of the target object in the feature space;
  by matching the second feature of the target object with features of objects in a matching library, obtaining a target feature matched with the second feature of the target object;
  determining an object to which the target feature belongs as a matching object of the target object.

In some examples, the method further includes:
  obtaining features of a plurality of sample objects extracted through the first extraction model and through the second extraction model;
  by inputting features of a target number of sample objects in the plurality of sample objects extracted through the first extraction model into a first initial feature conversion model, obtaining a first output result;
  determining a first loss value between the first output result and features of the target number of sample objects extracted through the second extraction model;
  according to the first loss value, the first initial feature conversion model, the features of the plurality of sample objects extracted through the first extraction model and through the second extraction model, determining the first feature conversion model.

In some examples, the method further includes:
  by inputting the first output result into a second initial feature conversion model, obtaining a second output result;
  determining a second loss value between the second output result and features of the target number of sample objects extracted through the first extraction model;
  where, according to the first loss value, the first initial feature conversion model, the features of the plurality of sample objects extracted through the first extraction model and through the second extraction model, determining the first feature conversion model comprises:
  according to the first loss value, the second loss value, the first initial feature conversion model, the features of the plurality of sample objects extracted through the first extraction model and through the second extraction model, determining the first feature conversion model.

In some examples, the method further includes:
  by inputting features of a target number of sample objects in the plurality of sample objects extracted through the second extraction model into the second initial feature conversion model, obtaining a third output result;
  determining a third loss value between the third output result and the features of the target number of sample objects extracted through the first extraction model;
  by inputting the third output result into the first initial feature conversion model, obtaining a fourth output result;
  determining a fourth loss value between the fourth output result and the features of the target number of sample objects extracted through the second extraction model;
  where according to the first loss value, the second loss value, the first initial feature conversion model, the features of the plurality of sample objects extracted through the first extraction model and through the second extraction model, determining the first feature conversion model comprises:
  according to the first loss value, the second loss value, the third loss value, the fourth loss value, the first initial feature conversion model, the second initial feature conversion model and the features of the plurality of sample objects extracted through the first extraction model and through the second extraction model, determining the first feature conversion model.

In some examples, the first loss value, the second loss value, the third loss value and the fourth loss value are all loss values obtained based on L1 loss; or,
  the first loss value, the second loss value, the third loss value and the fourth loss value are all loss values obtained based on L2 loss; or, the first loss value and the third loss value are both loss values obtained based on the L1 loss, and the second loss value and the fourth loss value are both loss values obtained based on the L2 loss.

According to a second aspect, there is provided a method of performing object recognition. The method includes:
by converting a third feature of each object in a matching library extracted by using a second extraction model to a feature space of a first extraction model through a second feature conversion model respectively, obtaining a fourth feature of each object in the feature space;
by matching a feature of a target object extracted using the first extraction model with the fourth feature of each object in the feature space, obtaining a target feature matched with the feature of the target object extracted using the first extraction model;
determining an object to which the target feature belongs as a matching object of the target object.

In some examples, the method further includes:
obtaining features of a plurality of sample objects extracted through the first extraction model and through the second extraction model;
by inputting features of a target number of sample objects in the plurality of sample objects extracted through the second extraction model into a second initial feature conversion model, obtaining a fifth output result;
determining a fifth loss value between the fifth output result and features of the target number of sample objects extracted through the first extraction model;
according to the fifth loss value, the second initial feature conversion model and the features of the plurality of sample objects extracted through the first extraction model and through the second extraction model, determining the second feature conversion model.

In some examples, the method further includes:
by inputting the fifth output result into a first initial feature conversion model, obtaining a sixth output result;
determining a sixth loss value between the sixth output result and features of the target number of sample objects extracted through the second extraction model;
where according to the fifth loss value, the second initial feature conversion model, and the features of the plurality of sample objects extracted through the first extraction model and through the second extraction model, determining the second feature conversion model includes:
according to the fifth loss value, the sixth loss value, the second initial feature conversion model, and the features of the plurality of sample objects extracted through the first extraction model and through the second extraction model, determining the second feature conversion model.

In some examples, the method further includes:
by inputting the features of a target number of sample objects in the plurality of sample objects extracted through the first extraction model into the first initial feature conversion model, obtaining a seventh output result;
determining a seventh loss value between the seventh output result and the features of the target number of sample objects extracted through the second extraction model;
by inputting the seventh output result into the second initial feature conversion model, obtaining an eighth output result;
determining an eighth loss value between the eighth output result and the features of the target number of sample objects extracted through the first extraction model;
where, according to the fifth loss value, the sixth loss value, the second initial feature conversion model, and the features of the plurality of sample objects extracted through the first extraction model and through the second extraction model, determining the second feature conversion model includes:
according to the fifth loss value, the sixth loss value, the seventh loss value, the eighth loss value, the first initial feature conversion model, the second initial feature conversion model, and the features of the plurality of sample objects extracted through the first extraction model and through the second extraction model, determining the second feature conversion model.

In some examples, the fifth loss value, the sixth loss value, the seventh loss value, and the eighth loss value are all loss values obtained based on L1 loss; or,
the fifth loss value, the sixth loss value, the seventh loss value, and the eighth loss value are all loss values obtained based on L2 loss; or,
the fifth loss value and the seventh loss value are both loss values obtained based on the L1 loss, and the sixth loss value and the eighth loss value are both loss values obtained based on the L2 loss.

According to a third aspect, there is provided an apparatus for performing object recognition. The apparatus includes:
a converting module, configured to, by converting a first feature of a target object extracted using a first extraction model to a feature space of a second extraction model through a first feature conversion model, obtain a second feature of the target object in the feature space;
a matching module, configured to:
by matching the second feature of the target object with features of objects in a matching library, obtain a target feature matched with the second feature of the target object;
determine an object to which the target feature belongs as a matching object of the target object.

In some examples, the apparatus further includes a training module, configured to:
obtain features of a plurality of sample objects extracted through the first extraction model and through the second extraction model;
by inputting features of a target number of sample objects in the plurality of sample objects extracted through the first extraction model into a first initial feature conversion model, obtain a first output result;
determine a first loss value between the first output result and features of the target number of sample objects extracted through the second extraction model;
according to the first loss value, the first initial feature conversion model, the features of the plurality of sample objects extracted through the first extraction model and through the second extraction model, determine the first feature conversion model.

In some examples, the training module is further configured to:
by inputting the first output result into a second initial feature conversion model, obtain a second output result;
determine a second loss value between the second output result and features of the target number of sample objects extracted through the first extraction model;

where the training module is configured to:
according to the first loss value, the second loss value, the first initial feature conversion model, the features of the plurality of sample objects extracted through the first extraction model and through the second extraction model, determine the first feature conversion model.

In some examples, the training module is further configured to:
by inputting features of a target number of sample objects in the plurality of sample objects extracted through the second extraction model into the second initial feature conversion model, obtain a third output result;
determine a third loss value between the third output result and the features of the target number of sample objects extracted through the first extraction model;
by inputting the third output result into the first initial feature conversion model, obtain a fourth output result;
determine a fourth loss value between the fourth output result and the features of the target number of sample objects extracted through the second extraction model;
where the training module is configured to:
according to the first loss value, the second loss value, the third loss value, the fourth loss value, the first initial feature conversion model, the second initial feature conversion model and the features of the plurality of sample objects extracted through the first extraction model and through the second extraction model, determine the first feature conversion model.

In some examples, the first loss value, the second loss value, the third loss value and the fourth loss value are all loss values obtained based on L1 loss; or,
the first loss value, the second loss value, the third loss value and the fourth loss value are all loss values obtained based on L2 loss; or,
the first loss value and the third loss value are both loss values obtained based on the L1 loss, and the second loss value and the fourth loss value are both loss values obtained based on the L2 loss.

According to a fourth aspect, there is provided an apparatus for performing object recognition. The apparatus includes:
a converting module, configured to, by converting a third feature of each object in a matching library extracted by using a second extraction model to a feature space of a first extraction model through a second feature conversion model respectively, obtain a fourth feature of each object in the feature space;
a matching module, configured to:
by matching a feature of a target object extracted using the first extraction model with the fourth feature of each object in the feature space, obtain a target feature matched with the feature of the target object extracted using the first extraction model;
determine an object to which the target feature belongs as a matching object of the target object.

In some examples, the apparatus further includes a training module, configured to:
obtain features of a plurality of sample objects extracted through the first extraction model and through the second extraction model;
by inputting features of a target number of sample objects in the plurality of sample objects extracted through the second extraction model into a second initial feature conversion model, obtain a fifth output result;
determine a fifth loss value between the fifth output result and features of the target number of sample objects extracted through the first extraction model;
according to the fifth loss value, the second initial feature conversion model and the features of the plurality of sample objects extracted through the first extraction model and through the second extraction model, determine the second feature conversion model.

In some examples, the training module is further configured to:
by inputting the fifth output result into a first initial feature conversion model, obtain a sixth output result;
determine a sixth loss value between the sixth output result and features of the target number of sample objects extracted through the second extraction model;
where the training module is further configured to:
according to the fifth loss value, the sixth loss value, the second initial feature conversion model, and the features of the plurality of sample objects extracted through the first extraction model and through the second extraction model, determine the second feature conversion model.

In some examples, the training module is further configured to:
by inputting the features of a target number of sample objects in the plurality of sample objects extracted through the first extraction model into the first initial feature conversion model, obtain a seventh output result;
determine a seventh loss value between the seventh output result and the features of the target number of sample objects extracted through the second extraction model;
by inputting the seventh output result into the second initial feature conversion model, obtain an eighth output result;
determine an eighth loss value between the eighth output result and the features of the target number of sample objects extracted through the first extraction model;
where the training module is configured to:
according to the fifth loss value, the sixth loss value, the seventh loss value, the eighth loss value, the first initial feature conversion model, the second initial feature conversion model, and the features of the plurality of sample objects extracted through the first extraction model and through the second extraction model, determine the second feature conversion model.

In some examples, the fifth loss value, the sixth loss value, the seventh loss value, and the eighth loss value are all loss values obtained based on L1 loss; or,
the fifth loss value, the sixth loss value, the seventh loss value, and the eighth loss value are all loss values obtained based on L2 loss; or,
the fifth loss value and the seventh loss value are both loss values obtained based on the L1 loss, and the sixth loss value and the eighth loss value are both loss values obtained based on the L2 loss.

According to a fifth aspect, there is provided a computer readable storage medium storing computer programs thereon, where the computer programs are executed by a processor to implement the method of performing object recognition according to the above first and second aspects.

According to a sixth aspect, there is provided a server for performing object recognition. The server includes a processor and a memory. The memory is configured to store computer programs, and the processor is configured to execute the programs stored in the memory to implement the method of performing object recognition according to the above first and second aspect.

The technical solutions provided by the embodiments of the present disclosure at least have the following beneficial effects.

In the embodiments of the present disclosure, by converting a first feature of a target object extracted using a first extraction model to a feature space of a second extraction model through a first feature conversion model, a second feature of the target object in the feature space is obtained and then by matching the second feature of the target object with a feature of an object in a matching library, a target feature matched with the second feature of the target object is obtained, and then an object to which the target feature belongs is determined as a matching object of the target object. In this way, when the feature extracted through the first extraction model is not matched with the feature extracted through the second extraction model directly, the feature extracted through the first extraction model is converted to the feature space of the second extraction model, such that the feature extracted through the first extraction model can be performed matching with the feature extracted through the second extraction model. Because the processing amount of the feature conversion is far less than re-extraction of the features in the matching library, thus saving the time length of object recognition.

BRIEF DESCRIPTION OF THE DRAWINGS

To describe the technical solutions in embodiments of the present disclosure more clearly, drawings required in descriptions of the embodiments will be briefly introduced below. It is apparent that the drawings described below are merely embodiments of the present disclosure and other drawings may be obtained by those of ordinary skill in the prior art based on these drawings without creative work.

DETAILED DESCRIPTION OF THE EMBODIMENTS

In order to make the objects, technical solutions and advantages of the present disclosure clearer, the specific embodiments of the present disclosure will be further elaborated below in combination with accompanying drawings.

Before implementation, introduction is firstly made to an application scenario of the embodiments of the present disclosure and term concepts possibly involved in the embodiments of the present disclosure.

Figure 1:
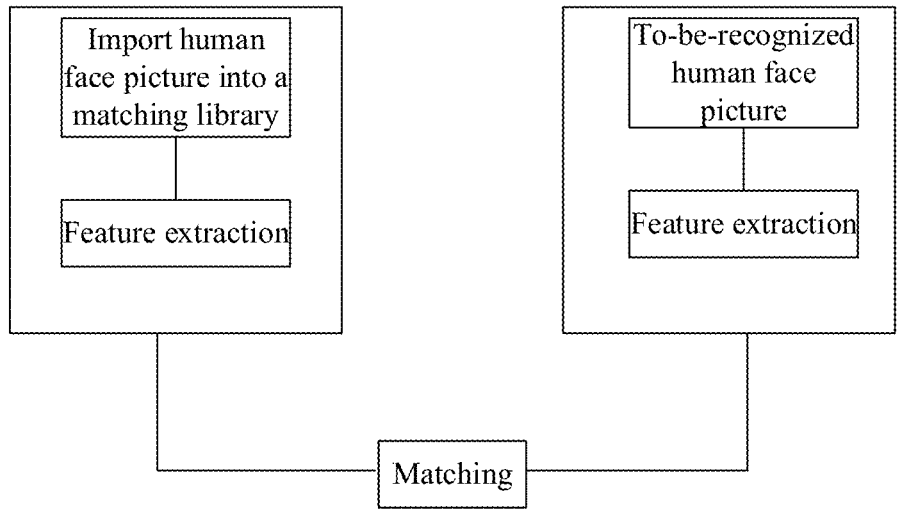
FIG. 1 is a schematic diagram illustrating an object recognition according to an embodiment of the present disclosure.

The embodiments of the present disclosure may be applied to biometric recognition scenarios such as human face recognition, fingerprint recognition, behavior feature recognition, and voiceprint recognition. As shown in FIG. 1, in a human face recognition scenario, a feature of each human face picture is pre-stored in a matching library. When it is determined whether a to-be-recognized human face picture is matched with a particular human face picture in the matching library, a feature of the to-be-recognized human face picture may be extracted, and then matched with the feature of each human face picture in the matching library to determine a human face picture with a highest similarity which is greater than a given value. Thus, it is determined that the human face picture with the highest similarity which is greater than the given value is matched with the to-be-recognized human face picture, that is, the human face picture and the to-be-recognized human face picture belong to a same identity.

The biometric recognition refers to performing authentication of personal identity based on biological features (such as fingerprint, iris and physiognomy) or behavior features inherent to a person by a computer.

Feature extraction refers to a dimension reduction process in which a most statistically meaningful feature is extracted by modeling samples.

Feature comparison refers to firstly performing feature extraction for a to-be-recognized object and then performing target search in a matching library for one-by-one comparison, and then finding out a best matching object based on feature similarity.

One or more embodiments of the present disclosure provide a method of performing object recognition. The execution subject of the method may be a server or a terminal device or the like. The server may include a processor, a memory and a transceiver and the like. The processor may be configured to perform a process of object recognition, for example, to convert a feature of a target object extracted using a first extraction model to a feature space of a second extraction model, where the target object is a to-be-recognized object. Further, the processor may be configured to determine a matching object of the target object. The memory may be configured to store data required in an object recognition process and data generated therein, for example, store a matching library including features of many objects. The transceiver may be used to receive and send data.

The terminal device may include a processor, a memory and a transceiver and the like. The processor may be configured to perform a process of object recognition. The memory is configured to store data required in an object recognition process and data generated therein. The transceiver may be used to receive and send data.

Figure 2:
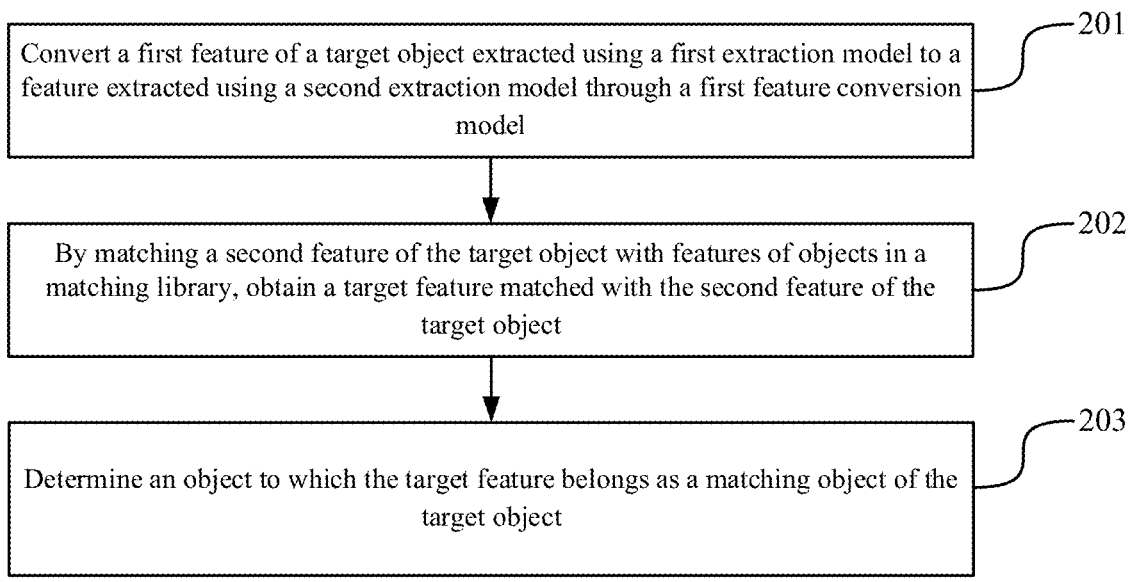
FIG. 2 is a flowchart illustrating a method of performing object recognition according to an embodiment of the present disclosure.

One or more embodiments of the present disclosure provide a method of performing object recognition, which may convert a feature of a to-be-recognized object to a feature compatible with extraction of a low version extraction model. As shown in FIG. 2, the method may be performed in the following flow.

At step 201, a first feature of a target object extracted using a first extraction model is converted to a feature extracted using a second extraction model through a first feature conversion model.

The target object is a to-be-recognized object, that is, an object with an undetermined identity. The target object may be a human face picture, a voiceprint, a fingerprint and the like. In the flow shown in FIG. 2, descriptions are made with a server as an execution subject for performing a method of object recognition. When a human face picture is snapped, the server needs to perform recognition for the human face picture, where the human face picture is a target object. For another example, when the server receives a fingerprint recognition request, a fingerprint carried in the fingerprint recognition request is a target object. In the embodiments of the present disclosure, descriptions are made with a human face picture as a target object. The first feature conversion model may be a fully-connected neural network. During object recognition, in order to be compatible with the features extracted using the low version extraction model, a feature extracted with a high version extraction model may be converted to a feature extracted using a low version extraction model, where the first extraction model is a high version extraction model and the second extraction model is a low version extraction model. One first feature conversion model may be pre-trained (the specific training process will be described below) to convert a feature of a particular object extracted using the first extraction model to a feature space of the second extraction model, thus achieving conversion of the feature of a particular object extracted using the first extraction model to a feature extracted using the second extraction model.

During implementation, after obtaining the target object, the server may obtain a first feature of the target object by inputting the target object into the first extraction model. In another example, a device connected with the server stores the first extraction model, and the device extracts the first feature of the target object using the first extraction model and then sends the first feature to the server. In this way, the sever may obtain the feature of the target object extracted using the first extraction model.

Then, the server obtains stored first feature conversion model, and inputs the first feature of the target object into the first feature conversion model, and converts the first feature of the target object to a feature space of a second extraction model to obtain a second feature of the target object in the feature space. The feature space of the second extraction model may refer to a feature space corresponding to features extracted using the second extraction model. Thus, the second feature of the target object in the feature space of the second extraction model is obtained.

It should be noted that, the first extraction model is a high version extraction model, the second extraction model is a low version extraction model, and the high version extraction model has a higher performance than the low version extraction model. The above conversion of the first feature to the feature space of the second extraction model may be converting the first feature to a feature having a same dimension as that of a feature in the feature space of the second extraction model based on a nonlinear mapping function or another conversion relationship. For example, if a dimension of the feature of the target object extracted directly using the second extraction model is 5, the dimension of the second feature obtained after the first feature is converted to the feature space of the second extraction model is also 5.

At step 202, by matching the second feature of the target object with features of objects in a matching library, a target feature matched with the second feature of the target object is obtained.

The feature of each object in the matching library is extracted using the second extraction model. When a particular object is input into the library, i.e., added to the matching library, the object may be input into the second extraction model with an output being the feature of the object extracted using the second extraction model, and the feature of the object is stored in the matching library.

During implementation, after the second feature of the target object in the feature space of the second extraction model is obtained, the second feature of the target object may be compared with the feature of each object in the matching library to obtain a similarity of the second feature of the target object and the feature of each object in the matching library, and then a feature with highest similarity which is greater than a target value is taken as a target feature matched with the second feature of the target object.

It should be noted that, the process of calculating the similarity may be a process of calculating a cosine distance, in which a cosine distance of the features is determined as a similarity between features. The above target value may be preset, for example, to 0.6, and stored in the server. Further, the feature of the target object extracted using the first extraction model is already converted to the feature space of the second extraction model, and therefore, may be directly compared with the feature of each object in the matching library.

At step 203, an object to which the target feature belongs is determined as a matching object of the target object.

During implementation, after the target feature is determined, the object to which the target feature belongs may be determined as the matching object of the target object. In this way, identity information of the matching object of the target object is determined as identity information of the target object, and thus the target object is no longer a to-be-recognized object.

In some embodiments of the present disclosure, there is further provided a process of training the first feature conversion model, which is detailed below.

Features of a plurality of sample objects extracted through the first extraction model and the second extraction model are obtained, and features of a target number of sample objects in the plurality of sample objects extracted through the first extraction model are input into a first initial feature conversion model to obtain a first output result; then, a first loss value between the first output result and features of the target number of sample objects extracted through the second extraction model is determined; then, according to the first loss value, the first initial feature conversion model, the features of the plurality of sample objects extracted through the first extraction model and through the second extraction model, the first feature conversion model is determined.

During implementation, a plurality of sample objects may be obtained (for example, a server obtains a plurality of sample objects from a device connected with the server, or receives a plurality of sample objects input by a user), and then input into the first extraction model to obtain features of the plurality of sample objects extracted through the first extraction model; and, a plurality of sample objects are input into the second extraction model to obtain features of the plurality of sample objects extracted through the second extraction model. In another example, the server obtains the features of a plurality of sample objects extracted through the first extraction model and through the second extraction model directly from a device connected with the server.

Figure 3:
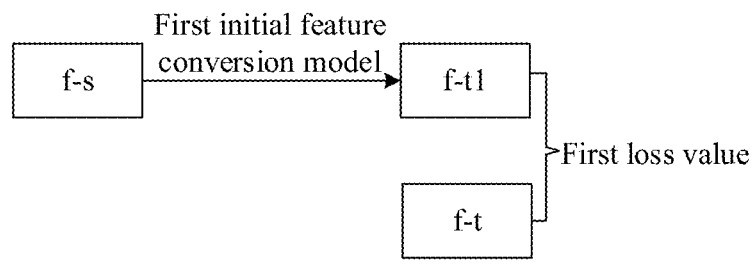
FIG. 3 is a schematic diagram illustrating a training according to an embodiment of the present disclosure.

Next, the features of a target number of sample objects in the plurality of sample objects extracted through the first extraction model are input into the first initial feature conversion model to obtain a first output result, and a first loss value between the first output result and the features of the target number of sample objects extracted through the second extraction model is calculated. By taking the first loss value as a constraint, parameter values of parameters in the first initial feature conversion model are adjusted based on a gradient descent algorithm, and then a target number of sample objects are re-selected from the plurality of sample objects to implement the above process so as to obtain another first loss value. The adjustment to the parameter values of the parameters in the first initial feature conversion model is continued until the first loss value is minimized. Thus, the first feature conversion model is obtained by substituting the parameter values of the parameters at the time of the first loss value being a minimum value, into the first initial feature conversion model. As shown in FIG. 3, the features of the sample objects extracted through the first extraction model are denoted as f-s, the features of the sample objects extracted through the second extraction model are denoted as f-t, and the first output result of the f-s passing through the first initial feature conversion model is f-t1 and thus a loss between the f-t1 and f-t is the first loss value.

In some examples, in order to enable the first feature conversion model to have better performance, more constraints may be used for training with the corresponding processing below.

The first output result is input into a second initial feature conversion model to obtain a second output result, a second loss value between the second output result and the features of a target number of sample objects extracted through the first extraction model is determined, and the first feature conversion model is determined according to the first loss value, the second loss value, the first initial feature conversion model, the features of the plurality of sample objects extracted through the first extraction model and through the second extraction model.

The features converted by the second initial feature conversion model may be converted to the feature space of the first extraction model from the feature space of the second extraction model.

During implementation, after the first output result is obtained, the first output result may be input into the second initial feature conversion model to obtain a second output result. Then, a second loss value between the second output result and the features of a target number of sample objects extracted through the first extraction model is determined. Then, parameter values of parameters in the first initial feature conversion model and the second initial feature conversion model are adjusted based on gradient descent algorithm until one set of parameter values can minimize the first loss value and the second loss value, thus obtaining the first feature conversion model and the second feature conversion model. Subsequently, during object recognition, only the first feature conversion model may be used.

In this way, since two losses are used as constraints, the trained first feature conversion model will have better performance.

In some examples, in order to enable the first feature conversion model to have better performance, more constraints may be used to train the first feature conversion model with processings detailed below.

The server inputs the features of a target number of sample objects in a plurality of sample objects extracted through the second extraction model into the second initial feature conversion model to obtain a third output result, a third loss value between the third output result and the features of the target number of sample objects extracted through the first extraction model is determined, and further, the third output result is input into the first initial feature conversion model to obtain a fourth output result, and a fourth loss value between the fourth output result and the features of a target number of sample objects extracted through the second extraction model is determined, and then according to the first loss value, the second loss value, the third loss value, the fourth loss value, the first initial feature conversion model, the second initial feature conversion model and the features of the plurality of sample objects extracted through the first extraction model and through the second extraction model, the first feature conversion model is determined.

Figure 4:
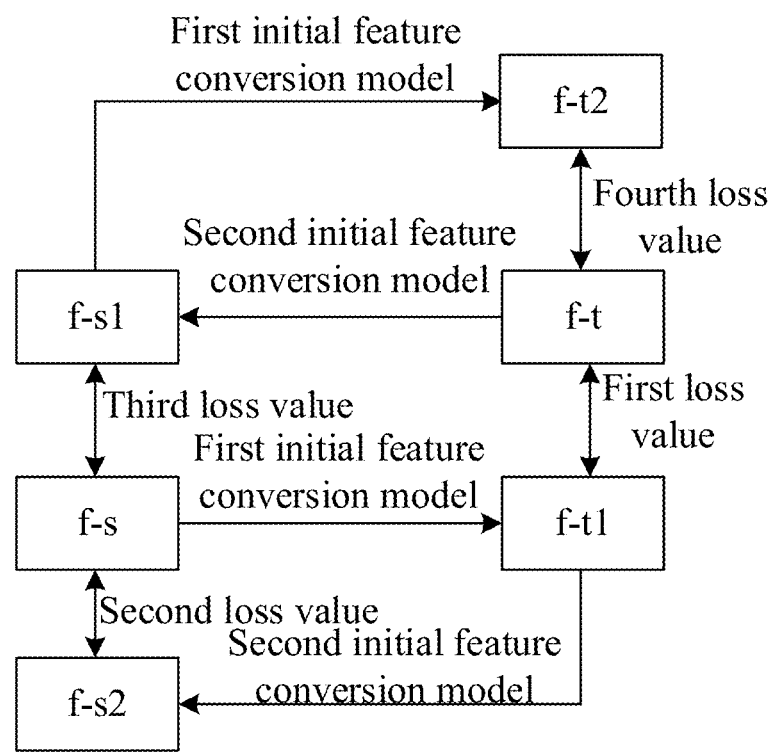
FIG. 4 is a schematic diagram illustrating a training according to an embodiment of the present disclosure.

During implementation, the server may input the features of a target number of sample objects in a plurality of sample objects extracted through the second extraction model into the second initial feature conversion model to obtain a third output result. A third loss value between the third output result and the features of the target number of sample objects extracted through the first extraction model is calculated. The third output result is input into the first initial feature conversion model to obtain a fourth output result. A fourth loss value between the fourth output result and the features of a target number of sample objects extracted through the second extraction model is determined. In this case, there are four loss values, i.e., the first loss value, the second loss value, the third loss value, and the fourth loss value. As shown in FIG. 4, the features of the sample objects extracted through the first extraction model are denoted as f-s, and the features of sample objects extracted through the second extraction model are denoted as f-t. The first output result of the f-s passing through the first initial feature conversion model is f-t1 and thus a loss between the f-t1 and f-t is the first loss value; the second output result of the f-t1 passing through the second initial feature conversion model is f-s2, and thus a loss between f-s2 and f-s is the second loss value; the third output result of the f-t passing through the second initial feature conversion model is f-s1 and thus a loss between the f-s1 and f-s is the third loss value; the fourth output result of the third output result f-s1 passing through the first initial feature conversion model is f-t2, and thus a loss between f-t2 and f-t is the fourth loss value.

Next, parameter values of parameters in the first initial feature conversion model and the second initial feature conversion model are adjusted based on gradient descent algorithm until one set of parameter values can minimize the first loss value, the second loss value, the third loss value and the fourth loss value, thus obtaining the first feature conversion model and the second feature conversion model. Subsequently, during object recognition, only the first feature conversion model may be used.

It is noted that, the "first", "second", "third" and "fourth" in the above first loss value, the second loss value, the third loss value and the fourth loss value are used to distinguish similar objects rather than to describe a particular sequence or order.

In some examples, the first loss value, the second loss value, the third loss value and the fourth loss value as above are all loss values obtained base on L1 loss. A formula for L1 loss may be expressed as:

$$L_1(\hat{y}-y) = \sum_{i=0}^{m}|y-\hat{y}(i)|$$

which represents a sum of absolute values of differences between actual values and estimated values of m features.

In some examples, the first loss value, the second loss value, the third loss value and the fourth loss value as above are all loss values obtained base on L2 loss. A formula for L2 loss may be expressed as:

$$L_2(\hat{y}-y) = \sum_{i=0}^{m}(y-\hat{y}(i))^2,$$

which represents a sum of squares of differences between actual values and estimated values of m features.

In some examples, the second loss value and the fourth loss value are both loss values obtained based on the L2 loss, and the first loss value and the third loss value as above are both loss values obtained based on the L1 loss.

During implementation, the expressions of the L1 loss and the L2 loss are described above. The first loss value is a loss value between an actual value and an estimated value after one conversion, the third loss value is a loss value between an actual value and an estimated value after one conversion, and the first loss value and the third loss value are obtained based on L1 loss. Since the L1 loss has better robustness, the first feature conversion model and the second feature conversion model trained with the L1 loss as a constraint will have better performance.

In the embodiments of the present disclosure, by converting a first feature of a target object extracted through a first extraction model to a feature space of a second extraction model through a first feature conversion model, a second feature of the target object in the feature space is obtained and then by matching the second feature of the target object with a feature of an object in a matching library, a target feature matched with the second feature of the target object is obtained, and then an object to which the target feature belongs is determined as a matching object of the target object. In this way, when the feature extracted through the second extraction model is not matched with the feature extracted through the first extraction model directly, the feature extracted through the first extraction model is converted to the feature space of the second extraction model, such that the feature extracted through the first extraction model can be performed matching with the feature extracted through the second extraction model. Because the processing amount of the feature conversion is far less than re-extraction of the features in the matching library, thus saving the time length of object recognition.

In addition, when matching is performed after feature conversion, although the performance of the matching is lower than the performance of the matching when the first extraction model is used directly for feature extraction, it is still higher than the performance of the matching when the second extraction model is used for feature extraction.

Figure 5:
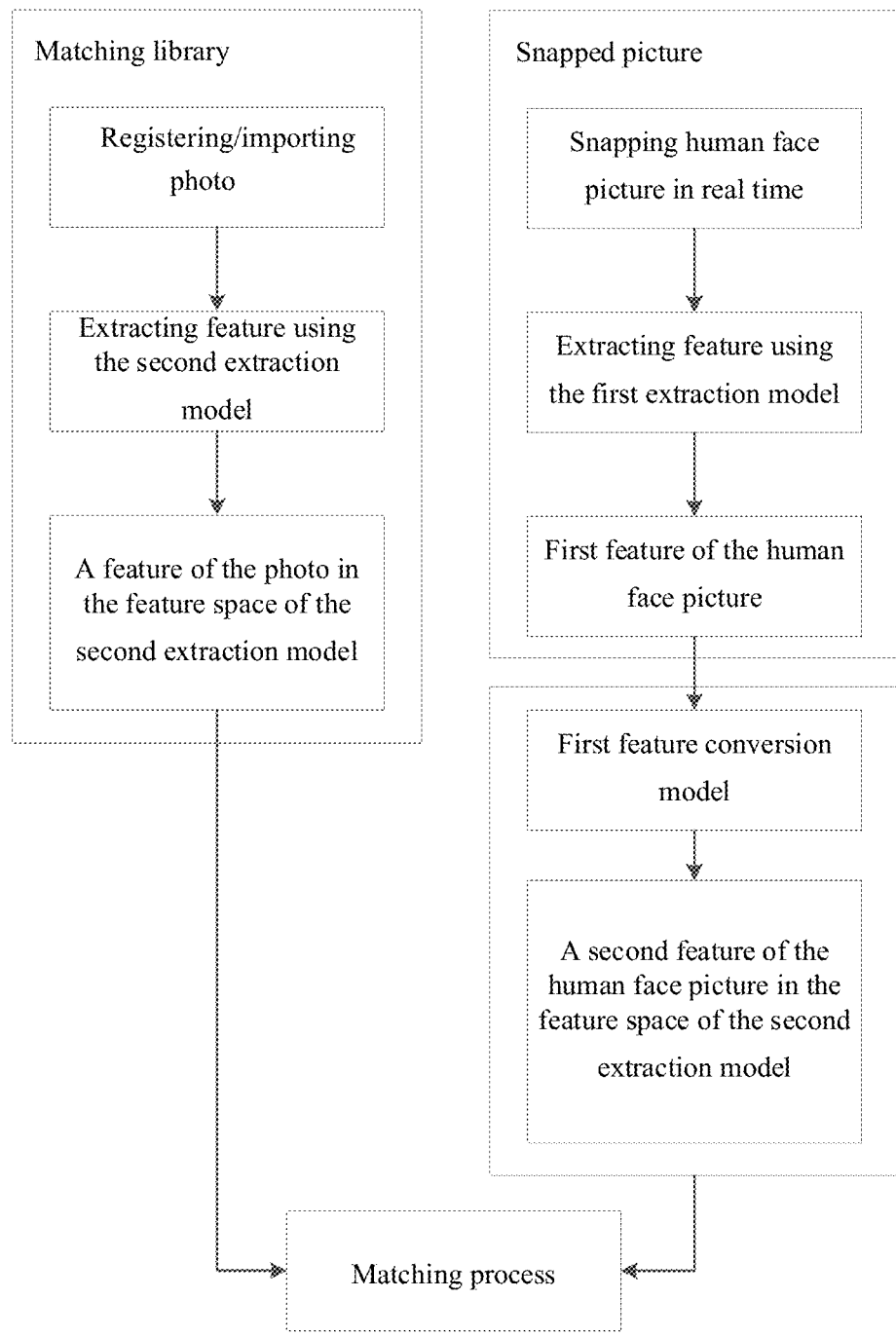
FIG. 5 is a flowchart illustrating a method of performing object recognition according to an embodiment of the present disclosure.

Corresponding to the flow shown in FIG. 2, in order to better understand the embodiments of the present disclosure, there is further provided a block diagram illustrating a processing flow in which the matching library is a photo matching library. As shown in FIG. 5, a photo imported or registered into the matching library is input into the second extraction model to obtain a feature of the photo in the feature space of the second extraction model. A human face picture (i.e., target object) snapped in real time is input into the first extraction model to obtain a first feature of the human face picture, and the first feature is input into the first feature conversion model to obtain a feature of the human face picture in the feature space of the second extraction model. In this case, the feature of the photo in the matching library and the feature of the human face picture obtained through the first feature conversion model both belong to the feature space of the second extraction model, thus they can be directly performed matching.

Figure 6:
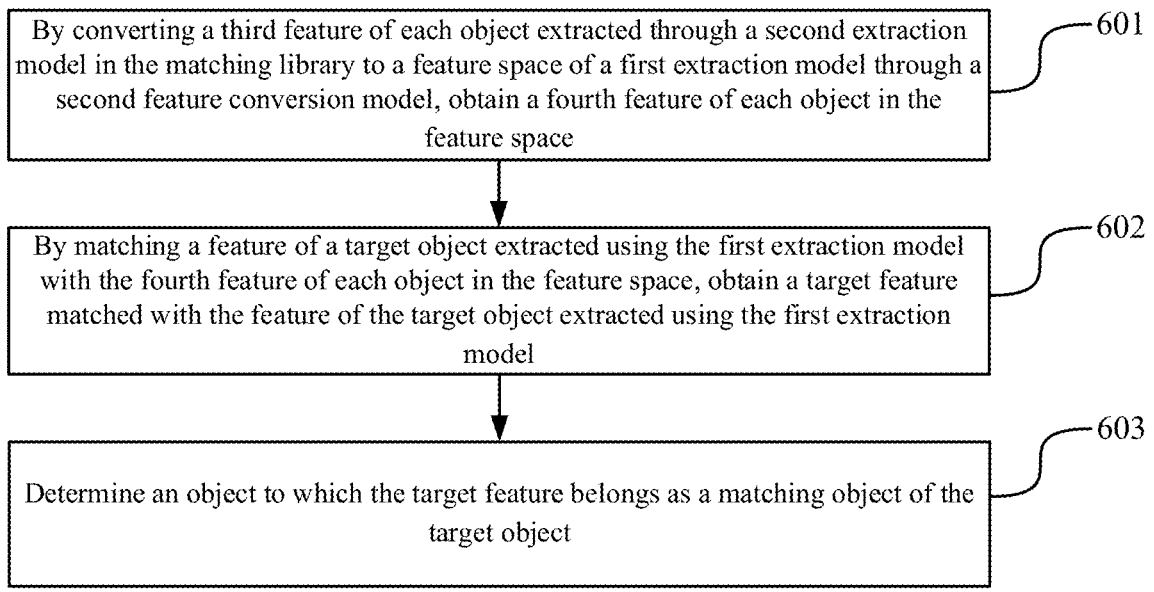
FIG. 6 is a flowchart illustrating a method of performing object recognition according to an embodiment of the present disclosure.

One or more embodiments of the present disclosure provide a method of performing object recognition, in which a feature in a matching library can be converted to a feature compatible with extraction of a high version extraction model. The execution subject of the method may be a server. As shown in FIG. 6, the flow of the method includes the following steps.

At step b 601, by converting a third feature of each object in the matching library extracted through a second extraction model to a feature space of a first extraction model through a second feature conversion model respectively, a fourth feature of each object in the feature space is obtained.

During implementation, when object recognition is performed, in order to be compatible with a feature extracted through a high version extraction model, a feature extracted with a low version extraction model may be converted to a feature space of the high version extraction model, where the first extraction model is a high version extraction model and the second extraction model is a low version extraction model. One feature conversion model (second feature conversion model) may be pre-trained to convert a feature extracted using the second extraction model to the feature space of the first extraction model.

After appearance of a high version extraction model, the third feature of each object in the matching library extracted using the second extraction model is converted to the feature space of the first extraction model by use of the second feature conversion model. In this way, the fourth feature of each object of the matching library in the feature space of the first extraction model is obtained.

It should be noted that, the first extraction model is a high version extraction model, the second extraction model is a low version extraction model, and the high version extraction model has a higher performance than the low version extraction model. The above conversion of the third feature to the feature space of the first extraction model may be converting the third feature to a feature having a same dimension as that of in the feature space of the first extraction model based on a nonlinear mapping function. For example, if a dimension of a feature of a particular object in the matching library extracted directly using the second extraction model is 5, after the third feature is converted to the feature space of the first extraction model, the dimension of the fourth feature is also 5.

At step 602, by matching a feature of a target object extracted using the first extraction model with the fourth feature of each object in the feature space, a target feature matched with the feature of the target object extracted using the first extraction model is obtained.

During implementation, when object recognition is performed, the feature of the target object may be obtained by extracting the feature of the target object using the first extraction model, and the feature of the target object is performed matching with the fourth feature of each object in the feature space of the first extraction model to obtain a similarity between the feature of the target object and the fourth feature of each object in the feature space, and then a feature with highest similarity greater than a target value is selected as the target feature.

At step 603, an object to which the target feature belongs is determined as a matching object of the target object.

During implementation, after the target feature is selected, the object to which the target feature belongs is determined as the matching object of the target object.

In this way, since the feature of each object in the matching library and the feature of the target object both belong to the feature space of the first extraction model, they can be performed matching directly.

In some embodiments of the present disclosure, provided is a process in which the second feature conversion model is trained with a processing procedure detailed below.

Features of a plurality of sample objects extracted through the first extraction model and the second extraction model are obtained, and features of a target number of sample objects in the plurality of sample objects extracted through the second extraction model are input into a second initial feature conversion model to obtain a fifth output result; then, a fifth loss value between the fifth output result and features of the target number of sample objects extracted through the first extraction model is determined; then, according to the fifth loss value, the second initial feature conversion model, the features of the plurality of sample objects extracted through the first extraction model and through the second extraction model, the second feature conversion model is determined.

During implementation, a plurality of sample objects may be obtained and then input into the first extraction model to obtain features of the plurality of sample objects extracted through the first extraction model; and, the plurality of sample objects are input into the second extraction model to obtain features of the plurality of sample objects extracted through the second extraction model. In another example, the server obtains the features of a plurality of sample objects extracted through the first extraction model and through the second extraction model directly from a device connected with the server.

Next, the features of the target number of sample objects in the plurality of sample objects extracted through the second extraction model are input into the second initial feature conversion model to obtain a fifth output result, and a fifth loss value between the fifth output result and the features of the target number of sample objects extracted through the first extraction model is calculated. By taking the fifth loss value as a constraint, parameter values of parameters in the second initial feature conversion model are adjusted based on a gradient descent algorithm, and then a target number of sample objects are re-selected from the plurality of sample objects to implement the above process so as to obtain another fifth loss value. The adjustment to the parameter values of the parameters in the second initial feature conversion model is continued until the fifth loss value is minimized. Thus, the second feature conversion model is obtained by substituting the parameter values of the parameters at the time of the fifth loss value being a minimum value, into the second initial feature conversion model.

In some examples, in order to enable the first feature conversion model to have better performance, more constraints may be used for training with the corresponding processing below.

The fifth output result is input into the first initial feature conversion model to obtain a sixth output result, a sixth loss value between the sixth output result and the features of a target number of sample objects extracted through the second extraction model is determined, and the second feature conversion model is determined according to the fifth loss value, the sixth loss value, the second initial feature conversion model, the features of the plurality of sample objects extracted through the first extraction model and through the second extraction model.

The features converted by the first initial feature conversion model may be converted from the feature space of the first extraction model to the feature space of the second extraction model.

During implementation, after the fifth output result is obtained, the fifth output result may be input into the first initial feature conversion model to obtain a sixth output result. Then, a sixth loss value between the sixth output result and the features of a target number of sample objects extracted through the second extraction model is determined. Then, parameter values of parameters in the first initial feature conversion model and the second initial feature conversion model are adjusted based on gradient descent algorithm until one set of parameter values can minimize the fifth loss value and the sixth loss value, thus obtaining the first feature conversion model and the second feature conversion model. Subsequently, during object recognition, only the second feature conversion model may be used.

In this way, since two losses are used as constraints, the trained second feature conversion model will have better performance.

In some examples, in order to enable the second feature conversion model to have better performance, more constraints may be used to train the second feature conversion model with processings detailed below.

The features of a target number of sample objects in a plurality of sample objects extracted through the first extraction model are input into the first initial feature conversion model to obtain a seventh output result, a seventh loss value between the seventh output result and the features of the target number of sample objects extracted through the second extraction model is determined, and further, the seventh output result is input into the second initial feature conversion model to obtain an eighth output result, and an eighth loss value between the eighth output result and the features of a target number of sample objects extracted through the first extraction model is determined, and then according to the fifth loss value, the sixth loss value, the seventh loss value, the eighth loss value, the first initial feature conversion model, the second initial feature conversion model and the features of the plurality of sample objects extracted through the first extraction model and through the second extraction model, the second feature conversion model is determined.

During implementation, the features of a target number of sample objects in a plurality of sample objects extracted through the first extraction model are input into the first initial feature conversion model to obtain a seventh output result. A seventh loss value between the seventh output result and the features of the target number of sample objects extracted through the second extraction model is calculated. The seventh output result is input into the second initial feature conversion model to obtain an eighth output result. An eighth loss value between the eighth output result and the features of a target number of sample objects extracted through the first extraction model is determined. In this case, there are four loss values, i.e., the fifth loss value, the sixth loss value, the seventh loss value, and the eighth loss value.

Next, parameter values of parameters in the first initial feature conversion model and the second initial feature conversion model are adjusted based on gradient descent algorithm until one set of parameter values can minimize the fifth loss value, the sixth loss value, the seventh loss value and the eighth loss value, thus obtaining the first feature conversion model and the second feature conversion model. Subsequently, during object recognition, only the second feature conversion model may be used.

It is noted that, the "fifth", "sixth", "seventh" and "eighth" in the above fifth loss value, the sixth loss value, the seventh loss value and the eighth loss value are used to distinguish similar objects rather than to describe a particular sequence or order.

In some examples, the fifth loss value, the sixth loss value, the seventh loss value and the eighth loss value as above are all loss values obtained base on L1 loss. A formula for L1 loss may be referred to the preceding descriptions.

In some examples, the fifth loss value, the sixth loss value, the seventh loss value and the eighth loss value as above are all loss values obtained base on L2 loss. A formula for L2 loss may be referred to the preceding descriptions.

In some examples, the fifth loss value and the seventh loss value as above are both loss values obtained based on the L1 loss, and the sixth loss value and the eighth loss value are both loss values obtained based on the L2 loss.

During implementation, the expressions of the L1 loss and the L2 loss are described above. The fifth loss value is a loss value between an actual value and an estimated value after one conversion, the seventh loss value is a loss value between an actual value and an estimated value after one conversion, and the fifth loss value and the seventh loss value are obtained based on L1 loss. Since the L1 loss has better robustness, the first feature conversion model and the second feature conversion model trained with the L1 loss as a constraint will have better performance.

In the embodiments of the present disclosure, the server obtains the second feature conversion model, and converts the third feature of each object in the matching library extracted through the second extraction model to the feature space of the first extraction model through the second feature conversion model respectively and obtains the fourth feature of the each object in the feature space and then by matching the feature of target object extracted using the first extraction model with the fourth feature of the each object in the feature space, a target feature matched with the feature of the target object extracted using the first extraction model is obtained, and then determines an object to which the target feature belongs as a matching object of the target object. In this way, when the feature extracted through the second extraction model cannot be matched with the feature extracted through the first extraction model directly, the feature extracted through the second extraction model is converted to the feature space of the first extraction model, such that the feature extracted through the first extraction model can be performed matching with the feature extracted through the second extraction model without needing to reuse the first extraction model to extract the feature in the matching library. In this way, the time length of object recognition can be saved.

In addition, it is noted that, when the above second feature conversion model performs feature conversion for a feature of a particular object, the calculation amount of the feature is smaller, and far lower than that of the feature of the object re-extracted using the first extraction model.

Furthermore, in order to understand the two embodiments of the present disclosure more easily, there is further provided an idea for the two embodiments of the present disclosure. Since a recognition algorithm itself has similar distinguishing capability for a specific object test set and a task target of each feature is consistent, although there is no direct linear correlation between the features of the extraction models of different versions, it can be assumed that there is a nonlinear mapping function which can map a feature from a feature space of a high version extraction model to a feature space of a low version extraction model.

Because the neural network is an excellent nonlinear mapper, the above first feature conversion model and second feature conversion model may be a neural network model. The first feature conversion model and the second feature conversion model may be a multiplayer fully-connected neural network, with its structure including a normalization layer, a fully-connected layer, a batch normalization layer, a hyperbolic tangent function processing layer. The normalization layer may be used to enable to a mode length of the vector to be 1, the batch normalization layer functions to achieve better convergence in a case of gradient descent and enable the trained first feature conversion model to have better performance. The hyperbolic tangent function is a nonlinear function, which can be used to fit a nonlinear mapping function.

For example, the first feature conversion model includes four layers of fully-connected neural networks, and each layer of fully-connected neural network includes one normalization layer, one fully-connected layer, one batch normalization layer and one hyperbolic tangent function layer. A first fully-connected layer has an input of 256 channels and an output of 512 channels, a second fully-connected layer has an input of 512 channels, and an output of 768 channels, a third fully-connected layer has an input of 768 channels and an output of 1024 channels, a fourth fully-connected layer has an input of 1024 channels and an output of 256 channels.

It is further noted that, in the above two embodiments, during training of a feature conversion model, after the parameter values of the parameters are adjusted each time, one batch of sample objects will be re-selected from a plurality of sample objects for training.

It is further noted that, in the above two embodiments, the first extraction model and the second extraction model is any models for feature extraction as long as the version of the first extraction model is higher than the version of the second extraction model, which is not limited in the embodiments of the present disclosure.

Figure 7:
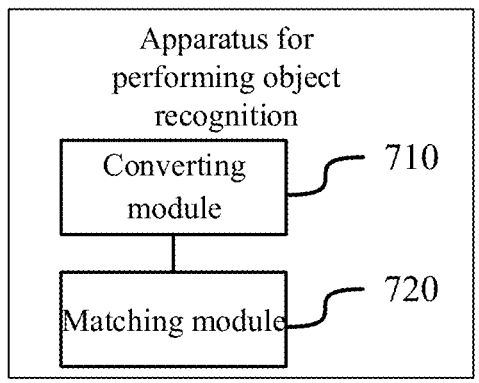
FIG. 7 is a schematic structural diagram illustrating an apparatus for performing object recognition according to an embodiment of the present disclosure.

Based on the same technical idea, one or more embodiments of the present disclosure further provide an apparatus for performing object recognition. As shown in FIG. 7, the apparatus includes:

a converting module 710, configured to, by converting a first feature of a target object extracted using a first extraction model to a feature space of a second extraction model through a first feature conversion model, obtain a second feature of the target object in the feature space;

a matching module 720, configured to:

by matching the second feature of the target object with features of objects in a matching library, obtain a target feature matched with the second feature of the target object;

determine an object to which the target feature belongs as a matching object of the target object.

Figure 8:
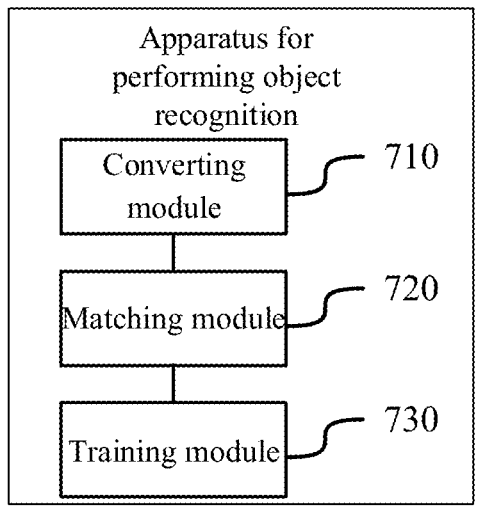
FIG. 8 is a schematic structural diagram illustrating an apparatus for performing object recognition according to an embodiment of the present disclosure.

In some examples, as shown in FIG. 8, the apparatus further includes a training module 730, configured to:

obtain features of a plurality of sample objects extracted through the first extraction model and through the second extraction model;

by inputting features of a target number of sample objects in the plurality of sample objects extracted through the first extraction model into a first initial feature conversion model, obtain a first output result;

determine a first loss value between the first output result and features of the target number of sample objects extracted through the second extraction model;

according to the first loss value, the first initial feature conversion model, the features of the plurality of sample objects extracted through the first extraction model and through the second extraction model, determine the first feature conversion model.

In some examples, the training module 730 is further configured to:

by inputting the first output result into a second initial feature conversion model, obtain a second output result;

determine a second loss value between the second output result and the features of the target number of sample objects extracted through the first extraction model;

the training module 730 is configured to:

according to the first loss value, the second loss value, the first initial feature conversion model, the features of the plurality of sample objects extracted through the first extraction model and through the second extraction model, determine the first feature conversion model.

In some examples, the training module 730 is further configured to:

by inputting features of a target number of sample objects in the plurality of sample objects extracted through the second extraction model into the second initial feature conversion model, obtain a third output result;

determine a third loss value between the third output result and the features of the target number of sample objects extracted through the first extraction model;

by inputting the third output result into the first initial feature conversion model, obtain a fourth output result;

determine a fourth loss value between the fourth output result and the features of the target number of sample objects extracted through the second extraction model;

the training module 730 is configured to:

according to the first loss value, the second loss value, the third loss value, the fourth loss value, the first initial feature conversion model, the second initial feature conversion model and the features of the plurality of sample objects extracted through the first extraction model and through the second extraction model, determine the first feature conversion model.

In some examples, the first loss value, the second loss value, the third loss value and the fourth loss value are all loss values obtained based on L1 loss; or, the first loss value, the second loss value, the third loss value and the fourth loss value are all loss values obtained based on L2 loss; or, the first loss value and the third loss value are both loss values obtained based on the L1 loss, and the second loss value and the fourth loss value are both loss values obtained based on the L2 loss.

In the embodiments of the present disclosure, by converting a first feature of a target object extracted using a first extraction model to a feature space of a second extraction model through a first feature conversion model, a second feature of the target object in the feature space is obtained and then by matching the second feature of the target object with a feature of an object in a matching library, a target feature matched with the second feature of the target object is obtained, and then an object to which the target feature belongs is determined as a matching object of the target object. In this way, when the feature extracted through the first extraction model is not matched with the feature extracted through the second extraction model directly, the feature extracted through the first extraction model is converted to the feature space of the second extraction model, such that the feature extracted through the first extraction model can be performed matching with the feature extracted through the second extraction model. Because the processing amount of the feature conversion is far less than re-extraction of the features in the matching library, thus saving the time length of object recognition.

It is noted that, the apparatus for performing object recognition provided by the embodiments of the present disclosure is illustrated only with division of the above functional modules during object recognition. In an actual application, the above functions may be distributed to different functional modules as required, that is, the internal structure of the apparatus is divided into different functional modules to complete part or all of the above described functions. Further, since the above embodiments of the apparatus for performing object recognition and the embodiments of the method for performing object recognition are based on a same idea, the specific implementation process of the apparatus embodiments may be referred to the method embodiments and no redundant descriptions are made herein.

Figure 9:
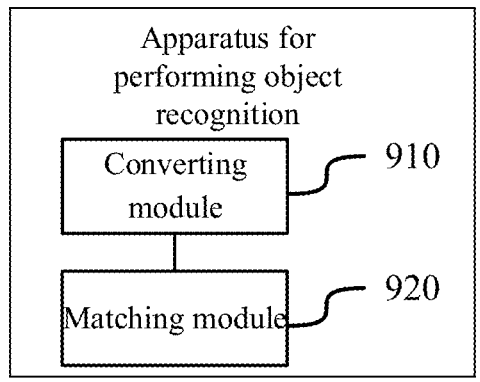
FIG. 9 is a schematic structural diagram illustrating an apparatus for performing object recognition according to an embodiment of the present disclosure.

Based on the same technical idea, an embodiment of the present disclosure provides an apparatus for performing object recognition. As shown in FIG. 9, the apparatus includes:

a converting module 910, configured to, by converting a third feature of each object in a matching library extracted by using a second extraction model to a feature space of a first extraction model through a second feature conversion model respectively, obtain a fourth feature of each object in the feature space;

a matching module 920, configured to:

by matching a feature of a target object extracted using the first extraction model with the fourth feature of each object in the feature space, obtain a target feature matched with the feature of the target object extracted using the first extraction model;

determine an object to which the target feature belongs as a matching object of the target object.

Figure 10:
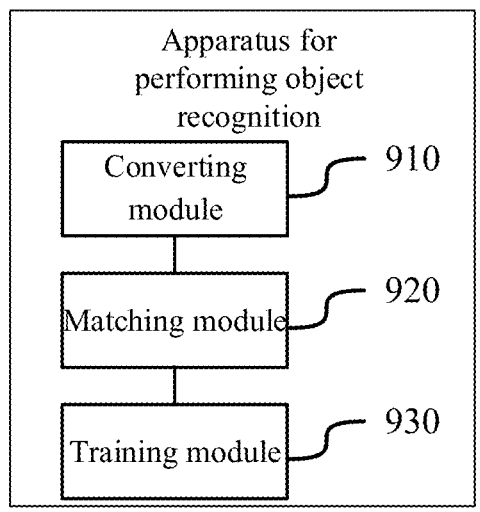
FIG. 10 is a schematic structural diagram illustrating an apparatus for performing object recognition according to an embodiment of the present disclosure.

In some examples, as shown in FIG. 10, the apparatus further includes a training module 930, configured to:

obtain features of a plurality of sample objects extracted through the first extraction model and through the second extraction model;

by inputting features of a target number of sample objects in the plurality of sample objects extracted through the second extraction model into a second initial feature conversion model, obtain a fifth output result;

determine a fifth loss value between the fifth output result and features of the target number of sample objects extracted through the first extraction model;

according to the fifth loss value, the second initial feature conversion model and the features of the plurality of sample objects extracted through the first extraction model and through the second extraction model, determine the second feature conversion model.

In some examples, the training module 930 is further configured to:

by inputting the fifth output result into a first initial feature conversion model, obtain a sixth output result;

determine a sixth loss value between the sixth output result and features of the target number of sample objects extracted through the second extraction model;

the training module 930 is further configured to:

according to the fifth loss value, the sixth loss value, the second initial feature conversion model, and the features of the plurality of sample objects extracted through the first extraction model and through the second extraction model, determine the second feature conversion model.

In some examples, the training module 930 is further configured to:

by inputting the features of a target number of sample objects in the plurality of sample objects extracted through the first extraction model into the first initial feature conversion model, obtain a seventh output result;

determine a seventh loss value between the seventh output result and the features of the target number of sample objects extracted through the second extraction model;

by inputting the seventh output result into the second initial feature conversion model, obtain an eighth output result;

determine an eighth loss value between the eighth output result and the features of the target number of sample objects extracted through the first extraction model;

the training module 930 is configured to:

according to the fifth loss value, the sixth loss value, the seventh loss value, the eighth loss value, the first initial feature conversion model, the second initial feature conversion model, and the features of the plurality of sample objects extracted through the first extraction model and through the second extraction model, determine the second feature conversion model.

In some examples, the fifth loss value, the sixth loss value, the seventh loss value, and the eighth loss value are all loss values obtained based on L1 loss; or, the fifth loss value, the sixth loss value, the seventh loss value, and the eighth loss value are all loss values obtained based on L2 loss; or, the fifth loss value and the seventh loss value are both loss values obtained based on the L1 loss, and the sixth loss value and the eighth loss value are both loss values obtained based on the L2 loss.

In the embodiments of the present disclosure, the second feature conversion model is obtained, the third feature of each object extracted through the second extraction model in a matching library is converted to the feature space of the first extraction model through the second feature conversion model respectively to obtain the fourth feature of the each object in the feature space and then the fourth feature of the each object in the feature space is performed matching with the feature of target object extracted using the first extraction model with the fourth feature of each object in the feature space to obtain a target feature matched with the feature of the target object extracted using the first extraction model, and then an object to which the target feature belongs is determined as a matching object of the target object. In this way, when the feature extracted through the second extraction model is not matched with the feature extracted through the first extraction model directly, the feature extracted through the second extraction model is converted to the feature space of the first extraction model, such that the feature extracted through the first extraction model can be performed matching with the feature extracted through the second extraction model without needing to reuse the first extraction model to extract the feature in the matching library. In this way, the time length can be saved.

It is noted that, the apparatus for performing object recognition provided by the embodiments of the present disclosure is illustrated only with division of the above functional modules during object recognition. In an actual application, the above functions may be distributed to different functional modules as required, that is, the internal structure of the apparatus is divided into different functional modules to complete part or all of the above-described functions. Further, since the above embodiments of the apparatus for performing object recognition and the embodiments of the method for performing object recognition are based on a same idea, the specific implementation process of the apparatus embodiments may be referred to the method embodiments and no redundant descriptions are made herein.

Figure 11:
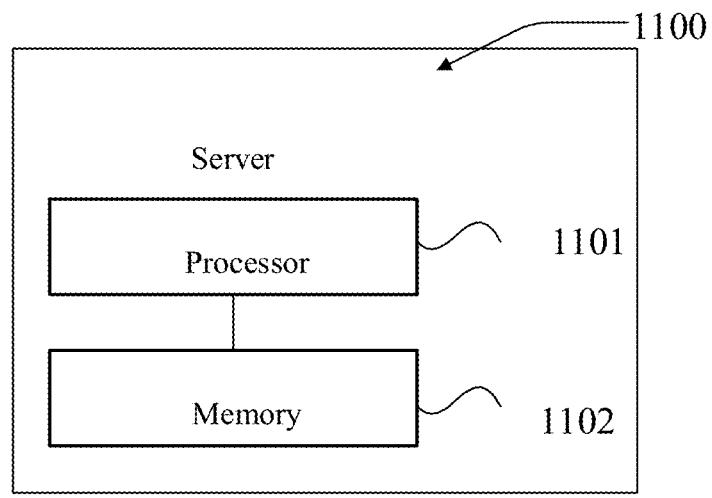
FIG. 11 is a schematic structural diagram illustrating a server according to an embodiment of the present disclosure.

FIG. 11 is a structural schematic diagram illustrating a server according to an embodiment of the present disclosure. The server 1100 may differ greatly for different configurations or performances, and may include one or more processors 1101 and one or more memories 1102. The memory 1102 stores at least one instruction which is loaded and executed by the processor 1101 to implement the steps of the above methods of performing object recognition.

An embodiment of the present disclosure further provides a computer readable storage medium storing computer programs therein, where the computer programs are executed by a processor to implement the method of performing object recognition.

An embodiment of the present disclosure further provides a server for performing object recognition. The server may include a processor and a memory. Where, the memory is configured to store computer programs, and the processor is configured to execute the programs stored in the memory to implement the above method of performing object recognition.

Those skilled in the art may understand that part or all steps for implementing the above embodiments may be completed by hardware, or by instructing relevant hardware through a program, where the program may be stored in a computer readable storage medium. The storage medium may be a Read Only Memory (ROM), a magnetic tape or compact disk and the like.

The above is merely preferred embodiments of the present disclosure and shall not be intended to limit the present disclosure. Any changes, equivalent substitutions and improvements and the like made within the spirit and principle of the present disclosure shall all fall within the scope of protection of the present disclosure.

The invention claimed is:

1. A method of performing object recognition, comprising:

by converting a first feature of a target object extracted using a first extraction model to a feature space of a second extraction model through a first feature conversion model, obtaining a second feature of the target object in the feature space;

by matching the second feature of the target object with features of objects in a matching library, obtaining a target feature matched with the second feature of the target object; and determining an object to which the target feature belongs as a matching object of the target object;
wherein the method further comprises:
obtaining features of a plurality of sample objects extracted through the first extraction model and through the second extraction model;
by inputting features of a target number of first sample objects in the plurality of sample objects extracted through the first extraction model into a first initial feature conversion model, obtaining a first output result;
determining a first loss value between the first output result and features of the target number of first sample objects extracted through the second extraction model; and
according to the first loss value, the first initial feature conversion model, the features of the plurality of sample objects extracted through the first extraction model and through the second extraction model, determining the first feature conversion model;
wherein according to the first loss value, the first initial feature conversion model, the features of the plurality of sample objects extracted through the first extraction model and through the second extraction model, determining the first feature conversion model, comprising:
by taking the first loss value as a constraint, adjusting parameter values of parameters in the first initial feature conversion model based on a gradient descent algorithm;
re-selecting a target number of second sample objects from the plurality of sample objects, obtaining another output result by inputting features of the target number of second sample objects extracted through the first extraction model into the first initial feature conversion model, determining another loss value between the another output result and features of the target number of second sample objects extracted through the second extraction model;
continuing to adjust the parameter values of the parameters in the first initial feature conversion model until a minimum loss value is obtained, and obtaining the first feature conversion model by substituting parameter values of parameters corresponding to the minimum loss value into the first initial feature conversion model.

2. The method of claim 1, further comprising:
by inputting the first output result into a second initial feature conversion model, obtaining a second output result;
determining a second loss value between the second output result and features of the target number of first sample objects extracted through the first extraction model;
wherein according to the first loss value, the first initial feature conversion model, the features of the plurality of sample objects extracted through the first extraction model and through the second extraction model, determining the first feature conversion model comprises:
according to the first loss value, the second loss value, the first initial feature conversion model, the features of the plurality of sample objects extracted through the first extraction model and through the second extraction model, determining the first feature conversion model.

3. The method of claim 2, further comprising:
by inputting features of a target number of third sample objects in the plurality of sample objects extracted through the second extraction model into the second initial feature conversion model, obtaining a third output result;
determining a third loss value between the third output result and the features of the target number of third sample objects extracted through the first extraction model;
by inputting the third output result into the first initial feature conversion model, obtaining a fourth output result;
determining a fourth loss value between the fourth output result and the features of the target number of third sample objects extracted through the second extraction model;
wherein according to the first loss value, the second loss value, the first initial feature conversion model, the features of the plurality of sample objects extracted through the first extraction model and through the second extraction model, determining the first feature conversion model comprises:
according to the first loss value, the second loss value, the third loss value, the fourth loss value, the first initial feature conversion model, the second initial feature conversion model and the features of the plurality of sample objects extracted through the first extraction model and through the second extraction model, determining the first feature conversion model.

4. The method of claim 3, wherein the first loss value, the second loss value, the third loss value and the fourth loss value are all loss values obtained based on L1 loss; or,
the first loss value, the second loss value, the third loss value and the fourth loss value are all loss values obtained based on L2 loss; or,
the first loss value and the third loss value are both loss values obtained based on the L1 loss, and the second loss value and the fourth loss value are both loss values obtained based on the L2 loss.

5. A non-transitory computer readable storage medium, storing computer programs thereon, wherein the computer programs are executed by a processor to implement the steps of the method according to claim 1.

6. A method of performing object recognition, comprising:
by converting a third feature of each object in a matching library extracted using a second extraction model to a feature space of a first extraction model through a second feature conversion model respectively, obtaining a fourth feature of each object in the feature space;
by matching a feature of a target object extracted using the first extraction model with the fourth feature of each object in the feature space, obtaining a target feature matched with the feature of the target object extracted using the first extraction model; and
determining an object to which the target feature belongs as a matching object of the target object.

7. The method of claim 6, further comprising:
obtaining features of a plurality of sample objects extracted through the first extraction model and through the second extraction model;
by inputting features of a target number of fourth sample objects in the plurality of sample objects extracted through the second extraction model into a second initial feature conversion model, obtaining a fifth output result;

determining a fifth loss value between the fifth output result and features of the target number of fourth sample objects extracted through the first extraction model; and according to the fifth loss value, the second initial feature conversion model and the features of the plurality of sample objects extracted through the first extraction model and through the second extraction model, determining the second feature conversion model;

wherein according to the fifth loss value, the second initial feature conversion model and the features of the plurality of sample objects extracted through the first extraction model and through the second extraction model, determining the second feature conversion model, comprising:

by taking the fifth loss value as a constraint, adjusting parameter values of parameters in the second initial feature conversion model based on a gradient descent algorithm;

re-selecting a target number of fifth sample objects from the plurality of sample objects, obtaining another output result by inputting features of the target number of fifth sample objects extracted through the second extraction model into the second initial feature conversion model, determining another loss value between the another output result and features of the target number of fifth sample objects extracted through the first extraction model;

continuing to adjust the parameter values of the parameters in the second initial feature conversion model until a minimum loss value is obtained, and obtaining the second feature conversion model by substituting parameter values of parameters corresponding to the minimum loss value into the second initial feature conversion model.

8. The method of claim 7, further comprising:

by inputting the fifth output result into a first initial feature conversion model, obtaining a sixth output result;

determining a sixth loss value between the sixth output result and features of the target number of fourth sample objects extracted through the second extraction model;

wherein according to the fifth loss value, the second initial feature conversion model, and the features of the plurality of sample objects extracted through the first extraction model and through the second extraction model, determining the second feature conversion model comprises:

according to the fifth loss value, the sixth loss value, the second initial feature conversion model, and the features of the plurality of sample objects extracted through the first extraction model and through the second extraction model, determining the second feature conversion model.

9. The method of claim 8, further comprising:

by inputting the features of a target number of sixth sample objects in the plurality of sample objects extracted through the first extraction model into the first initial feature conversion model, obtaining a seventh output result;

determining a seventh loss value between the seventh output result and the features of the target number of sixth sample objects extracted through the second extraction model;

by inputting the seventh output result into the second initial feature conversion model, obtaining an eighth output result;

determining an eighth loss value between the eighth output result and the features of the target number of sixth sample objects extracted through the first extraction model;

wherein according to the fifth loss value, the sixth loss value, the second initial feature conversion model, and the features of the plurality of sample objects extracted through the first extraction model and through the second extraction model, determining the second feature conversion model comprises:

according to the fifth loss value, the sixth loss value, the seventh loss value, the eighth loss value, the first initial feature conversion model, the second initial feature conversion model, and the features of the plurality of sample objects extracted through the first extraction model and through the second extraction model, determining the second feature conversion model.

10. The method of claim 9, wherein the fifth loss value, the sixth loss value, the seventh loss value, and the eighth loss value are all loss values obtained based on L1 loss; or, the fifth loss value, the sixth loss value, the seventh loss value, and the eighth loss value are all loss values obtained based on L2 loss; or, the fifth loss value and the seventh loss value are both loss values obtained based on the L1 loss, and the sixth loss value and the eighth loss value are both loss values obtained based on the L2 loss.

11. A server for performing object recognition, comprising a processor, and a memory, wherein the memory is configured to store at least one instruction; and the processor is configured to execute the at least one instruction stored in the memory to implement the following operations:

by converting a first feature of a target object extracted using a first extraction model to a feature space of a second extraction model through a first feature conversion model, obtaining a second feature of the target object in the feature space;

by matching the second feature of the target object with features of objects in a matching library, obtaining a target feature matched with the second feature of the target object; and determining an object to which the target feature belongs as a matching object of the target object;

wherein the processor is configured to implement the following operations:

obtaining features of a plurality of sample objects extracted through the first extraction model and through the second extraction model;

by inputting features of a target number of first sample objects in the plurality of sample objects extracted through the first extraction model into a first initial feature conversion model, obtaining a first output result;

determining a first loss value between the first output result and features of the target number of first sample objects extracted through the second extraction model; and according to the first loss value, the first initial feature conversion model, the features of the plurality of sample objects extracted through the first extraction model and through the second extraction model, determining the first feature conversion model;

wherein when according to the first loss value, the first initial feature conversion model, the features of the plurality of sample objects extracted through the first extraction model and through the second extraction model, determining the first feature conversion model, the processor is configured to implement operations comprising:
by taking the first loss value as a constraint, adjusting parameter values of parameters in the first initial feature conversion model based on a gradient descent algorithm;
re-selecting a target number of second sample objects from the plurality of sample objects, obtaining another output result by inputting features of the target number of second sample objects extracted through the first extraction model into the first initial feature conversion model, determining another loss value between the another output result and features of the target number of second sample objects extracted through the second extraction model;
continuing to adjust the parameter values of the parameters in the first initial feature conversion model until a minimum loss value is obtained, and obtaining the first feature conversion model by substituting parameter values of parameters corresponding to the minimum loss value into the first initial feature conversion model.

12. The server of claim 11, wherein the processor is configured to implement the following operations:
by inputting the first output result into a second initial feature conversion model, obtaining a second output result;
determining a second loss value between the second output result and features of the target number of first sample objects extracted through the first extraction model;
wherein according to the first loss value, the first initial feature conversion model, the features of the plurality of sample objects extracted through the first extraction model and through the second extraction model, determining the first feature conversion model comprises:
according to the first loss value, the second loss value, the first initial feature conversion model, the features of the plurality of sample objects extracted through the first extraction model and through the second extraction model, determining the first feature conversion model.

13. The server of claim 12, wherein the processor is configured to implement the following operations:
by inputting features of a target number of third sample objects in the plurality of sample objects extracted through the second extraction model into the second initial feature conversion model, obtaining a third output result;
determining a third loss value between the third output result and the features of the target number of third sample objects extracted through the first extraction model;
by inputting the third output result into the first initial feature conversion model, obtaining a fourth output result;
determining a fourth loss value between the fourth output result and the features of the target number of third sample objects extracted through the second extraction model;
wherein according to the first loss value, the second loss value, the first initial feature conversion model, the features of the plurality of sample objects extracted through the first extraction model and through the second extraction model, determining the first feature conversion model comprises:
according to the first loss value, the second loss value, the third loss value, the fourth loss value, the first initial feature conversion model, the second initial feature conversion model and the features of the plurality of sample objects extracted through the first extraction model and through the second extraction model, determining the first feature conversion model.

14. The server of claim 13, wherein the first loss value, the second loss value, the third loss value and the fourth loss value are all loss values obtained based on L1 loss; or,
the first loss value, the second loss value, the third loss value and the fourth loss value are all loss values obtained based on L2 loss; or,
the first loss value and the third loss value are both loss values obtained based on the L1 loss, and the second loss value and the fourth loss value are both loss values obtained based on the L2 loss.

* * * * *